Patented May 24, 1949

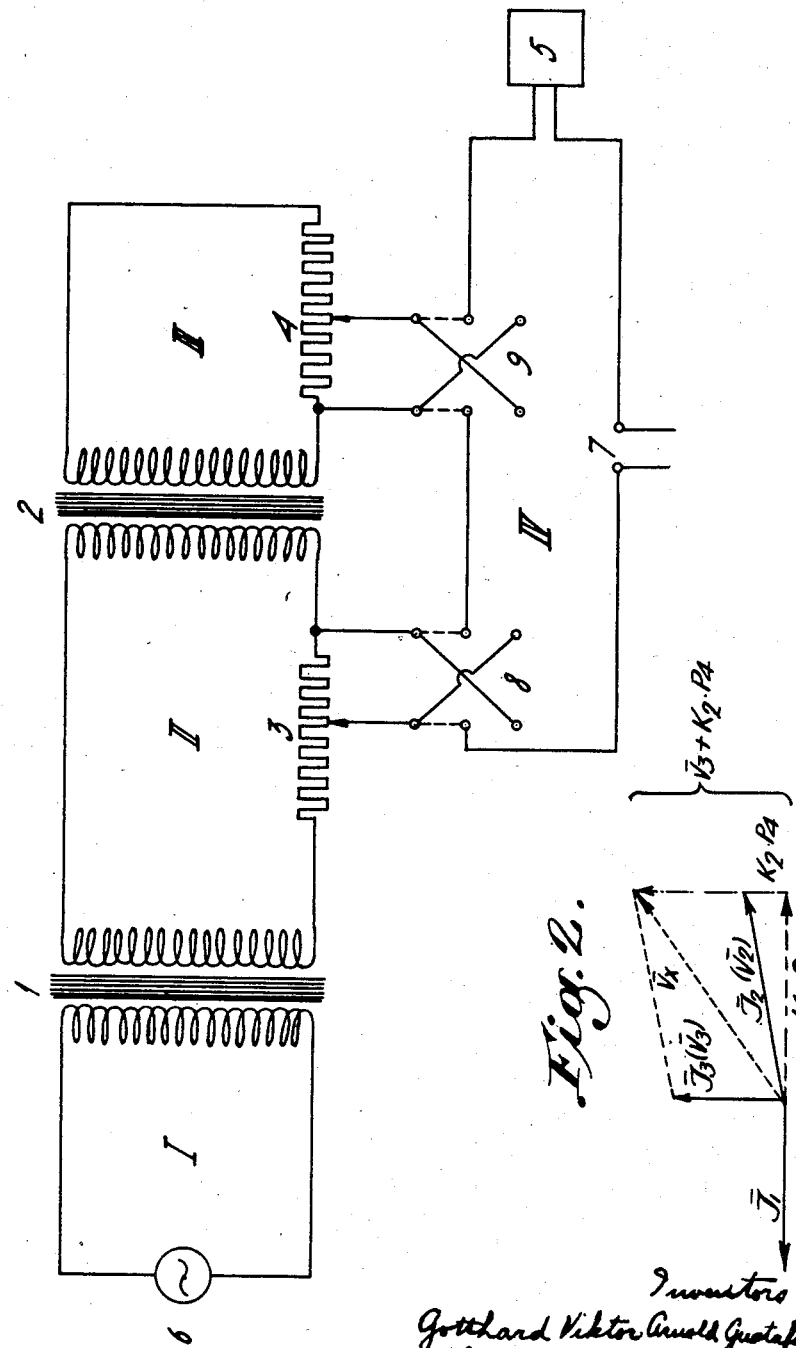

2,471,105

UNITED STATES PATENT OFFICE 2,471,105

ALTERNATING CURRENT COMPENSATOR CIRCUIT FOR MEASURING

Gotthard Viktor Arnold Gustafsson, Akeshov, and Johan David Malmqvist, Boliden, Sweden, assignors to Bolidens Gruvaktiebolag, Stockholm, Sweden, a limited joint-stock company of Sweden Application December 12, 1944, Serial No. 567,882
In Sweden July 7, 1943

Section 1, Public Law 690, August 8, 1946
Patent expires July 7, 1963

5 Claims. (Cl. 171—95)

In prospecting for ore and in other geoelectrical investigations and in determining the resistance of minerals, rocks, earths and electrolytes, several kinds of compensating devices for alternating current have been used. All devices hitherto known, however, have been poorly adapted to field use or to the making of practical measurements of this kind.

The purpose of the compensating device of the type herein described is to measure an unknown alternating current by synthetically producing a current which is equal to it in voltage and phase. The unknown current and the synthetically produced current, are generally introduced, in opposition, into a closed circuit, and current flow in that circuit brought to zero by adjustment of the characteristics of the synthetic current. The characteristics of the synthetic current are determined by the settings of the equipment used to produce it and these settings then give the characteristics of the unknown current.

In the Larsen-compensator, the most common for measurement in the field, the interpretation of the results obtained by the measurements is very difficult. The alternating voltages to be determined, are compensated, with regard to amplitude and phase, by means of two wheels. With one wheel the compensating voltage is controlled by means of a potentiometer device, and with the other wheel a compensating voltage 90° out of phase to the first-mentioned voltage is controlled by increasing or reducing the mutual inductance between two coils. There exists, however, no simple relation between the measured compensation voltages and the values to be determined, and therefore nomograms must be used. Besides, it is difficult, technically, to construct a good variable mutual inductance, and the Larsen-compensator can only with difficulty be dimensioned for all necessary measuring ranges.

The present invention has for its object a simple, rugged compensator for alternating current, the settings of which can easily be translated into measurements of the synthetic current supplied by the compensator, and which device is well adapted for field use.

The compensator of this invention consists of a primary circuit that includes a generator of alternating current and the primary of a transformer. It further includes a secondary circuit which includes the secondary of the afore-mentioned transformer, the primary of another transformer, and the resistance coil of a variable potentiometer, all connected in series. It still further includes a tertiary circuit that consists of the secondary of the second transformer and the resistance coil of a second variable potentiometer.

The first transformer is so constructed that the voltage of the current induced from the primary circuit into the secondary circuit will be displaced in phase approximately 180° in relation to voltage of the current in the primary circuit. The second transformer is so constructed that the voltage of the current induced in the tertiary circuit from the secondary circuit will be displaced approximately 90° in phase to the voltage of the current in the secondary circuit, and hence will be approximately 90° or 270° out of phase with relation to the voltage of the current in the primary circuit.

By taking any desired proportion of the voltage in the secondary circuit from the variable potentiometer in that circuit, and combining it with any desired proportion of the voltage in the tertiary circuit, taken from the variable potentiometer in that circuit, a voltage may be produced which has any desired magnitude and phase relation to the voltage in the primary circuit, or to the voltage of the unknown current to be measured, that may be desired. Knowing the characteristics of the primary current, it is relatively simple to calculate from the settings of the two variable potentiometers the voltage and the phase of the current produced by the compensator. By the adjustment of the potentiometers, and by using pole-changing switches in the outputs from the potentiometers and taking into consideration their settings, it is relatively easy to produce a current that will match in voltage and phase any current that it is desired to measure, and to quickly and easily determine, with considerable accuracy, both the voltage and phase of that current, and hence the voltage and phase of the current to be measured.

In the drawings Figure 1 is a schematic illustration of a compensator, in accordance with this invention, connected to a zero reading electrical instrument and a source of an unknown current to be measured.

Figure 2 is a vector diagram illustrative of the principles upon which this invention is based.

Figure 3:
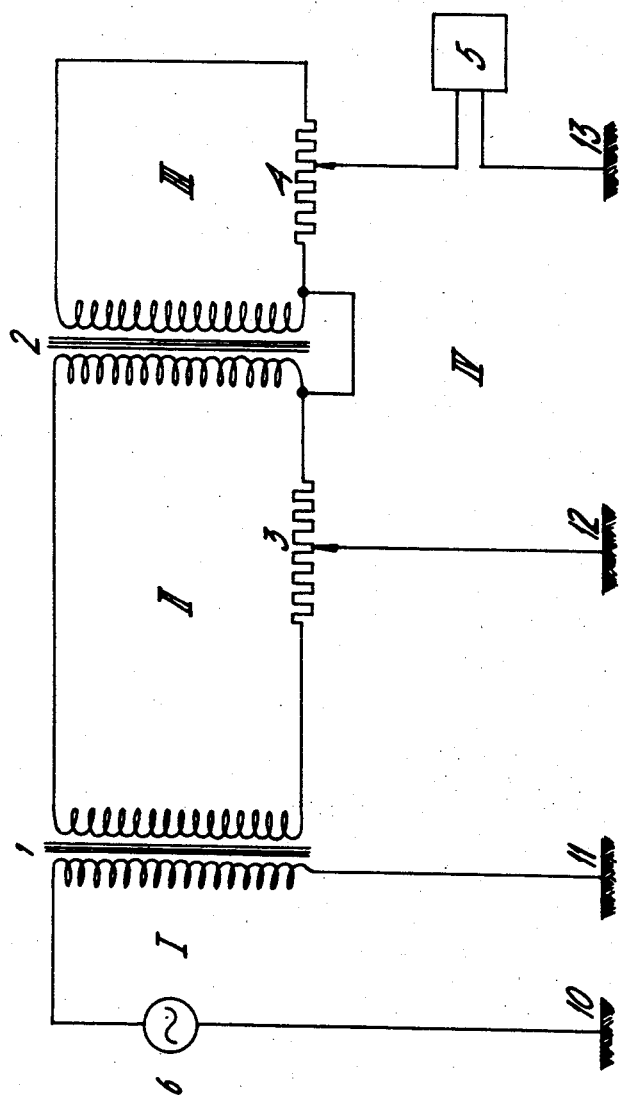
Figure 3 is a schematic illustration of a compensator of the type illustrated in Figure 1, but connected to measure currents induced into the earth and transmitted therethrough to a distant point, there to have its phase and voltage characteristics determined.

The compensator comprises two transformers 1 and 2, two variable potentiometers 3 and 4 and a zero instrument 5 connected into a circuit that includes the variable portions of the two potentiometers connected in series with the source of the unknown current to be made. An alternating current generator 6 is connected to the primary winding of the transformer 1 and forms the current circuit I. The secondary winding of the same transformer 1, is connected to the circuit II in series to the potentiometer resistance 3, and the primary winding of the transformer 2. The secondry winding of the transformer 2, is connected in series to the potentiometer resistance 4, and forms the circuit III. The alternating voltage $V_x$ to be measured, is connected to the current tap 7 and is compensated by means of current tappings from the variable potentiometers 3 and 4. At complete compensation no current will flow through the circuit IV, which contains the voltage $V_x$ to be measured, and the voltages $V_2$ and $V_3$ tapped from the potentiometers 3 and 4. The completeness of the compensation is controlled by means of a zero instrument 5, which may be a telephone, a tube voltmeter, a vibration galvanometer or the like. In order to increase the accuracy of the zero compensation the zero instrument 5 can also comprise an amplifier. By means of the two reversing switches 8 and 9 all voltages $V_x$ having the same frequency as the primary current can be compensated independently of their voltage and phase. When complete compensation has been accomplished the current flow in the measuring circuit will be zero because the voltages from the potentiometer will exactly balance the input voltage.

The condition for the relation between the voltage $V_3$ and the primary current being purely imaginary, i. e. the voltage being 90° out of phase in relation to the primary current, is that the dimensions of the parts are such as to make $R_2 \cdot R_3 = \omega^2 \cdot L_{21} \cdot L_{23}$. In this expression $\omega$ indicates the angular velocity of the alternating current. This may be expressed as $2\pi f$, in which $f$=the frequency, and $R_2$ and $R_3$ indicate the total ohmic resistances in the circuits II and III respectively. $L_{21}$ and $L_3$ represent respectively the self-inductances of the secondary winding of the first transformer 1 and of the secondary winding of the second transformer 2. If, at the same time, the ohmic resistance $R_3$ is made rather high in relation to the inductive reactance $\omega L_3$, the relation between the voltage $V_2$ and the intensity of the primary current will be nearly in phase, viz. $V_2$ displaced in phase nearly 180° in relation to the primary current. Thus, the idea of the invention is that by dimensioning the parts of the apparatus in the said manner one will attain a remarkably simple measuring of the alternating voltage, and furthermore, the apparatus is of very simple design. Furthermore the measuring of the compensating voltage, at least with regard to the in phase part, is less dependent on the frequency than is the case in other compensator devices. The measurement is independent of the intensity of the primary current (its amplitude), so that the resistance to be determined is obtained directly. The measurement is also independent of variations in amplitude and frequency of the primary current (the generator voltage), when this primary current circuit is also used to supply the current which is to be eventually measured.

The course of the current in the various circuits will be most clearly illustrated by a vector diagram, Fig. 2. The current vector in the primary circuit I is indicated by $\bar{I}_1$, in the secondary circuit II by $\bar{I}_2$ and in the tertiary circuit III by $\bar{I}_3$. When the resistances in the potentiometers 3 and 4 are purely ohmic, the compensation voltages $\bar{V}_2$ and $\bar{V}_3$ are in phase with the current intensities in the respective circuits. It will be apparent from the vector diagram that $\bar{I}_2$ and $\bar{V}_2$ respectively have a nearly opposite direction to $\bar{I}_1$, i. e. are displaced in phase 180°, whereas $\bar{I}_3$ and $\bar{V}_3$ respectively are perpendicular to $\bar{I}_1$, i. e. 90° out of phase. As will be easily understood, in compensating a certain voltage $V_x$ to be measured, the adjustment of the potentiometer 4 ($P_4$) indicates, but for a constant factor, directly the real portion of the voltage to be measured ($V_x \text{ real} = K_1 \cdot P_4$), whereas the adjustment of the potentiometer 3 indicates substantially the out of phase part ($V_x \text{ imag.} = \pm \bar{V}_3 \pm K_2 \cdot P_4$)

In practice the compensator can be utilized for several different purposes. In determining resistances of rocks, minerals, electrolytes and earths a connection as shown in Fig. 3, may be used. The current from the generator 6 is passed through the electrodes 10 and 11, into the earth, the electrolyte or the rock and the difference in voltage between the electrodes 12 and 13, which are placed in a manner suitable for effecting the measurement are determined in the manner stated above.

Figure 4:
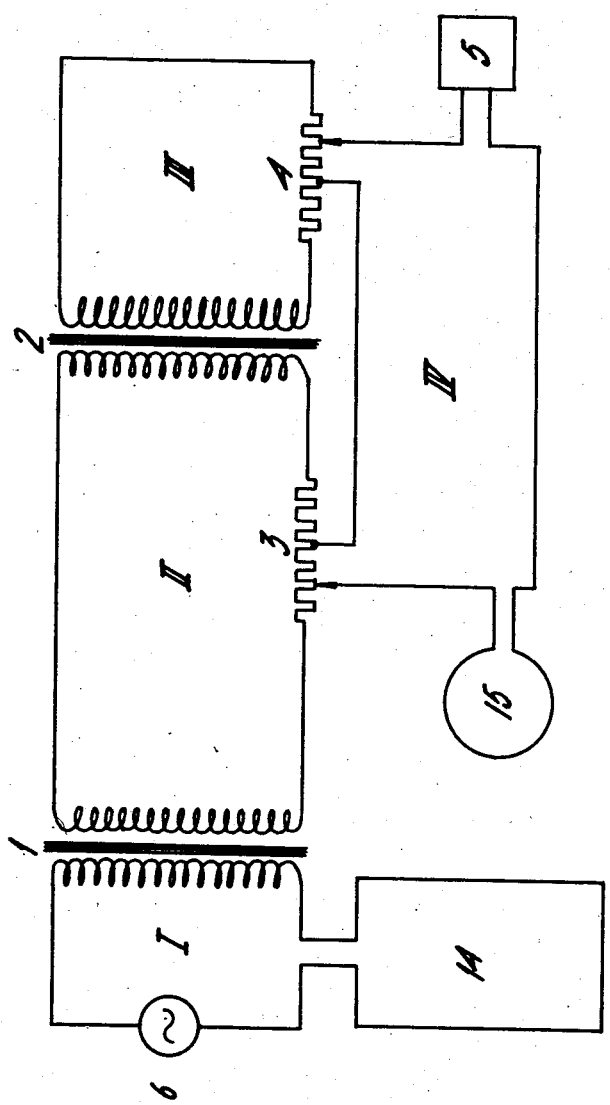
Figure 4 is a schematic illustration of a similar device, in which the current which is to be measured is radiated from a loop attached to the primary circuit and received by a loop at a distant point.

In measuring electromagnetic fields in the earth, formed by currents of grounded electrodes, or laid out rectilinear, circular or rectangular cables or the like, the voltage in a measuring coil or a measuring frame induced by the field is determined by the compensator described. The principle is shown in Fig. 4, in which the laid out coil is indicated by 14 and the measuring coil is indicated by 15. In Figures 3 and 4 the reversing switches in the circuit IV (indicated in Fig. 1 by 8 and 9) are not shown in order to make the diagrams more clear.

The compensator as described can also be utilized for the comparison of the electromotive fields at two points. Then one measuring coil is connected to the primary winding of the transformer 1 and the other measuring coil is connected in the same manner as the coil 15 in Fig. 4. The compensator may also be used for measuring alternating voltages generally in many other connections.

By means of the compensator as described a high degree of accuracy of the measurement can be obtained even at comparatively great variations in amplitude and frequency of the primary current.

The invention is not limited to the couplings shown in the diagrams, but may also be utilized when the primary, secondary or tertiary circuits are subdivided into two or more divisional circuits by means of inserted resistances, inductive coils and/or condensers.

Having thus described our invention we declare that what we claim is:

1. A compensating circuit for alternating voltage measurements that comprises a primary circuit, a secondary circuit, a tertiary circuit, and a measuring circuit including input connections for the voltage to be measured, the primary circuit including an alternating current power source and being coupled to the secondary circuit by a transformer, the secondary circuit including the resistance element of a potentiometer and being coupled to the tertiary circuit by a transformer, the tertiary circuit including the resistance element of a second potentiometer, and the measuring circuit including variable portions of each of the potentiometers as controlled by the sliding contact thereof, and also a detector of alternating current connected into the measuring circuit so as to measure alternating current therein.

2. A device of the type described in claim 1, further characterized in that the variable portion of at least one of the potentiometers is connected into the measuring circuit through a pole changing switch.

3. A compensating circuit for alternating voltage measurements that comprises a primary circuit, a secondary circuit, a tertiary circuit, and a measuring circuit including input connections for the voltage to be measured, the primary circuit including an alternating current power source and being coupled to the secondary circuit by a transformer, the secondary circuit including the resistance element of a potentiometer and being coupled to the tertiary circuit by a transformer, the tertiary circuit including the resistance element of a second potentiometer, and the measuring circuit including variable portions of each of the potentiometers as controlled by the sliding contact thereof, and also a detector of alternating current connected into the measuring circuit so as to measure alternating current therein, the transformer coupling between the primary, secondary and tertiary circuits being such that the secondary circuit is caused to be substantially 180° out of phase with the primary circuit and the tertiary circuit is caused to be substantially 90° out of phase with the primary circuit.

4. A compensating circuit for alternating voltage measurements that comprises a primary circuit, a secondary circuit, a tertiary circuit, and a measuring circuit including input connections for the voltage to be measured, the primary circuit including an alternating current power source and being coupled to the secondary circuit by a transformer, the secondary circuit including the resistance element of a potentiometer and being coupled to the teritary circuit by a transformer, the tertiary circuit including the resistance element of a second potentiometer, and the measuring circuit including variable portions of each of the potentiometers as controlled by the sliding contact thereof, and also a detector of alternating current connected into the measuring circuit so as to measure alternating current therein, the coupling between the primary, secondary and tertiary circuits being such that the tertiary circuit is caused to be substantially 90° out of phase with the primary circuit.

5. A compensating circuit for alternating voltage measurements that comprises a primary circuit, a secondary circuit, a tertiary circuit, and a measuring circuit including input connections for the voltage to be measured, the primary circuit including an alternating current power source and being coupled to the secondary circuit by a transformer, the secondary circuit including the resistance elements of a potentiometer and being coupled to the tertiary circuit by a transformer, the tertiary circuit including the resistance element of a second potentiometer, and the measuring circuit including variable portions of each of the potentiometers as controlled by the sliding contact thereof, and also a detector of alternating current connected into the measuring circuit so as to measure alternating current therein, the constants of the primary, secondary and tertiary circuits being such that the product of the ohmic resistances of the secondary and tertiary circuits is equal to the product of the inductive reactances in the secondary windings of the transformer.

GOTTHARD VIKTOR ARNOLD
                        GUSTAFSSON.
JOHAN DAVID MALMQVIST.

REFERENCES CITED

The following references are of record in the file of this patent:

UNITED STATES PATENTS

| Number | Name | Date |
|---|---|---|
| 1,897,688 | Ambronn | Feb. 14, 1933 |
| 2,265,978 | Batchelder | Dec. 16, 1941 |
| 2,316,434 | Irwin | Apr. 13, 1943 |

OTHER REFERENCES

"Geophysical Exploration," Heiland, pp. 763–764, 778–782, pub. 1940 by Prentice-Hall, Inc., N. Y. C. (Copy in Div. 48.)